US007353553B2

(12) United States Patent
Huse

(10) Patent No.: US 7,353,553 B2
(45) Date of Patent: Apr. 8, 2008

(54) INNER SPRING SEAT SYSTEM

(75) Inventor: Ovie Clarence Huse, Mineral Wells, TX (US)

(73) Assignee: Moeller Marine Products, Twinsburg, OH (US)

( * ) Notice: Subject to any disclaimer, the term of this patent is extended or adjusted under 35 U.S.C. 154(b) by 238 days.

(21) Appl. No.: 11/127,005

(22) Filed: May 11, 2005

(65) Prior Publication Data
US 2005/0253442 A1 Nov. 17, 2005

Related U.S. Application Data

(60) Provisional application No. 60/570,322, filed on May 12, 2004.

(51) Int. Cl.
*A47C 7/18* (2006.01)
(52) U.S. Cl. ........................ 5/653; 5/237; 297/452.53
(58) Field of Classification Search ................ 5/237, 5/653, 654, 654.1, 718, 719, 655.7; 297/452.53, 297/452.57, 142, 143, 145, 131, 133
See application file for complete search history.

(56) References Cited

U.S. PATENT DOCUMENTS

| 2,821,243 | A | * | 1/1958 | Toulmin Jr. ............ 297/452.51 |
| 3,210,782 | A | * | 10/1965 | Mitchell et al. ............. 5/655.9 |
| 3,716,875 | A | * | 2/1973 | Fehr ........................... 5/655.7 |
| 3,833,260 | A | | 9/1974 | Harder, Jr. |
| 3,833,454 | A | * | 9/1974 | Ambrose ................ 297/452.57 |
| 4,365,840 | A | | 12/1982 | Kehl et al. |
| 4,369,535 | A | * | 1/1983 | Ekkerink ........................ 5/690 |
| 4,803,118 | A | * | 2/1989 | Sogi et al. ................... 442/189 |
| 4,837,881 | A | | 6/1989 | Kondo et al. |
| 4,861,104 | A | | 8/1989 | Malak |
| 5,288,134 | A | | 2/1994 | Hewko et al. |
| 5,704,691 | A | | 1/1998 | Olson |
| 5,931,538 | A | | 8/1999 | Cayet et al. |
| 6,027,171 | A | | 2/2000 | Partington et al. |
| 6,089,657 | A | | 7/2000 | Banno et al. |
| 6,457,777 | B1 | | 10/2002 | Kazuno et al. |
| 6,571,411 | B1 | | 6/2003 | Ebe |
| 6,634,718 | B2 | | 10/2003 | Matsuo |
| 6,733,084 | B2 | | 5/2004 | Butler |

\* cited by examiner

*Primary Examiner*—Michael Trettel
(74) *Attorney, Agent, or Firm*—William H. Honaker; Dickinson Wright PLLC

(57) ABSTRACT

A seat assembly and method of fabricating the seat assembly including a cushion (20) of a resilient foam having a lower face (22), and a frame (24) having a plurality of flexible bands (30) extending in a bowed path between opposite sides of the frame (24) and engaging the lower face (22) of the cushion (20). The cushion (20) is molded over the bands (30) and wrapped around the sides (28) of the frame (24).

10 Claims, 3 Drawing Sheets

INNER SPRING SEAT SYSTEM

CROSS REFERENCE TO RELATED APPLICATION

This application claims the benefit of the filing date of U.S. Provisional Patent Application Ser. No. 60/570,322, filed May 12, 2004, all of its contents incorporated herein in their entirety.

BACKGROUND OF THE INVENTION

1. Field of the Invention

The subject invention relates to a seat assembly, and more particularly, to a marine seat assembly having a frame and a cushion attached to the frame to provide a soft support, resiliency, and cushioning to a user.

2. Description of the Prior Art

Numerous seat assemblies with means for providing resiliency and cushioning to a user and to preclude excessive sagging under the weight of the user are known in the prior art. Generally, when traveling at a high speed, a boat can be subject to heavy and violent blows and shocks as a result of the boat traversing the waves. Such blows cause discomfort and may make a marine voyage or fishing trip very unpleasant.

One conventional system for providing resiliency and cushioning to the user and to preclude excessive sagging under the weight of the user is disclosed in U.S. Pat. No. 3,833,952 to Rosenberg (the Rosenberg patent). The Rosenberg patent discloses an energy absorption system for a seat assembly having a plurality of nonlinear support elements between a metal seat pan and the buttocks of a user. Each of these support elements is equipped with a helical spring that cushions the user. As appreciated by those skilled in the art of marine vehicles, the use of springs of any kind to provide resiliency to the seat in the marine industry is not recommended due to the corrosive elements, water, salt, etc. encountered in typical marine applications. Several prior art patents, more particularly, U.S. Pat. No. 5,441,331 to Vento (the Vento patent), U.S. Pat. No. 6,010,195 to Masters et al. (the Masters patent), and U.S. Pat. No. 6,234,578 to Barton et al. (the Barton patent) tried to substitute the use of the springs by new inventive approaches discussed below.

The Vento patent shows a suspension system installed in a seat assembly used in a motor vehicle. The suspension system comprises an elastomeric fabric capable of providing sufficient strength to support the user. The elastomeric fabric forming suspension system is affixed to front and rear rods by any conventional means. The front and rear rods are attached to a seat assembly frame by attachments, wherein the attachments are installed within the seat frame first to secure the suspension system therewithin.

The Masters patent shows a seat assembly that includes a seat bottom trim supported on a pan defining an aperture portion. The seat frame assembly includes a mat disposed in the aperture of the pan for cushioning support of an occupant. The mat comprises a flexible woven material suspended across the aperture portion by rings and provides a soft support for the occupant.

The Barton patent shows a seat assembly including a seat bottom comprising a frame with side walls. The frame includes a central cutout region surrounded by a peripheral edge and a support mat that extends across the central cutout region. The mat is formed of a rubber suspension material or webbing to provide a balance between support and resiliency. The seating assembly includes a plurality of tabs to provide adjacent a peripheral edge of the central cutout to provide attachment locations for the mat that further includes a plurality of openings adapted to receive the tabs.

One of the areas of continuous development and research is the area of a more advanced design of a seat assembly for a boat. The opportunity remains for a new design of the seat assembly, where, unlike typical seats, a new seat assembly is easy to fabricate, simple to assemble, cost effective and does not employ the use of springs to provide resiliency to a seat portion of the seat assembly, specially when used in the marine industry, due to the corrosive elements, water, salt, etc. found in typical marine applications.

SUMMARY OF THE INVENTION AND ADVANTAGES

The present invention is a seat assembly comprising a cushion of a resilient foam having a lower face. The assembly also includes a frame having a plurality of flexible elements extending between opposite sides of the frame and engaging the lower face of the cushion. The invention is distinguished by each of the flexible elements comprising a band.

The present invention also includes a method of fabricating the seat assembly by forming a band to define each of the flexible elements during the fabrication of the frame.

The present invention provides a new design of a marine seat assembly. The seat assembly is easy to fabricate, simple to assemble, cost effective and does not employ the use of springs to provide resiliency to a seat portion of the seat assembly, particularly since the seat assembly shall be used in the marine industry.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
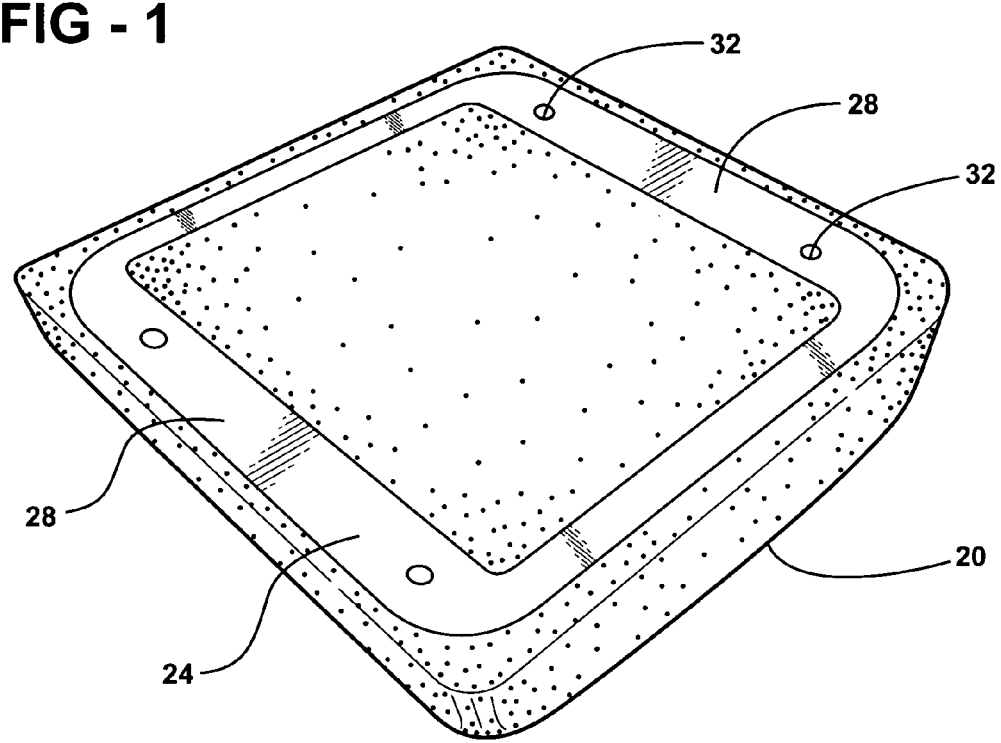
FIG. 1 is a bottom view of a seat assembly of the present invention.
Figure 2:
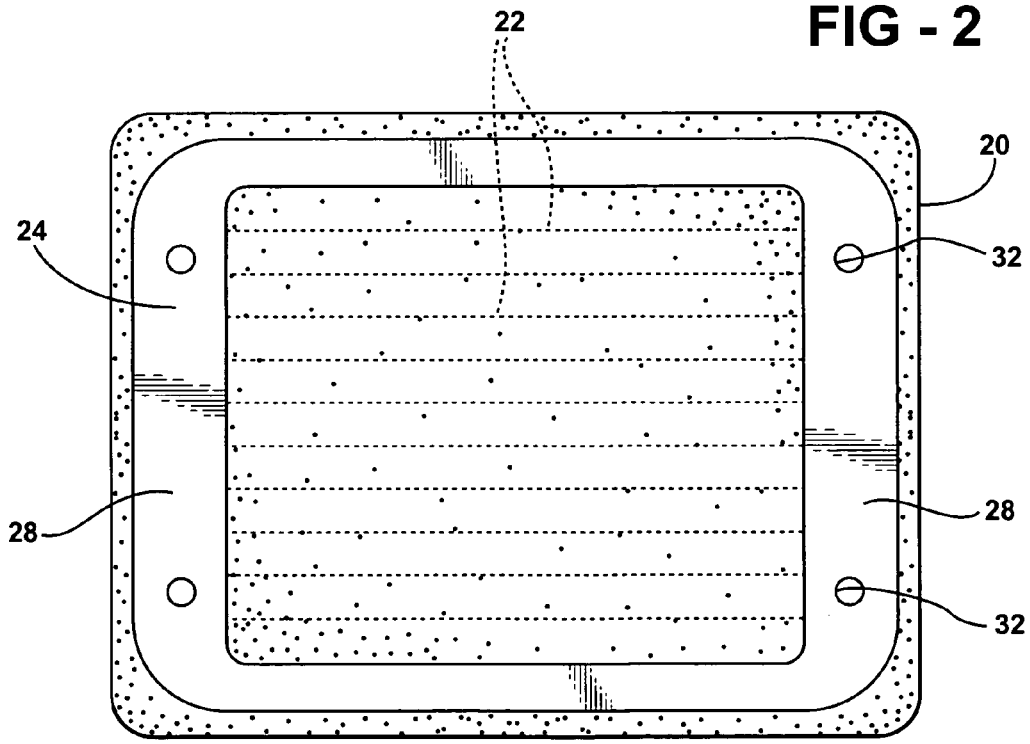
FIG. 2 is a perspective view of the seat assembly shown in FIG. 1.
Figure 3:
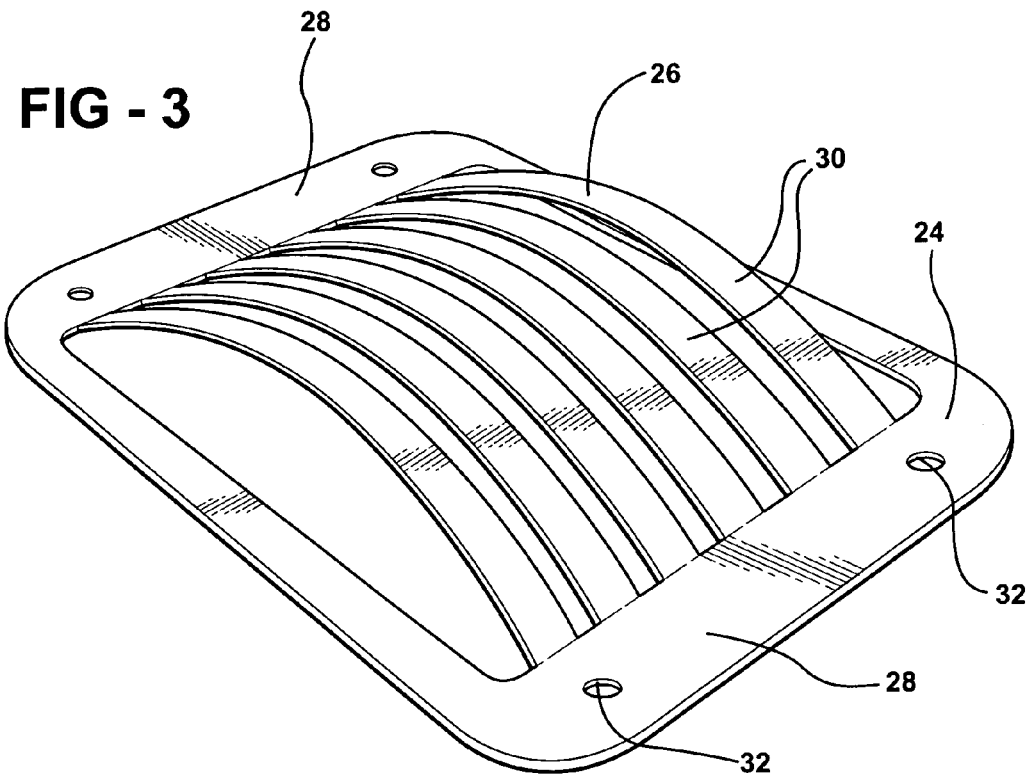
FIG. 3 is a perspective view of the top of a frame of the seat assembly shown in FIG. 1.
Figure 4:
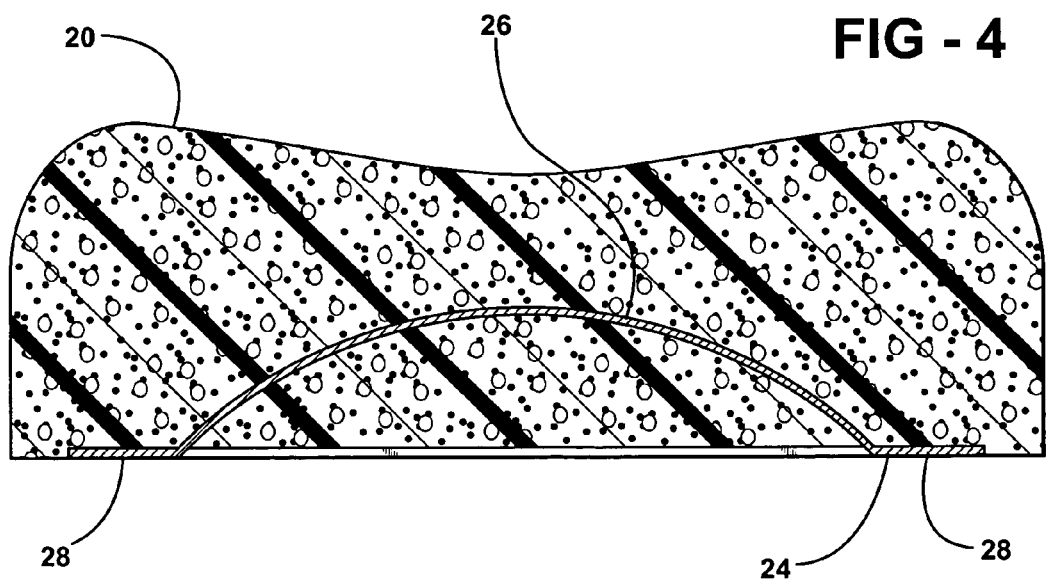
FIG. 4 is a side view of the frame enclosed in a cushion of the seat assembly shown in FIGS. 1 and 2.
Figure 5:
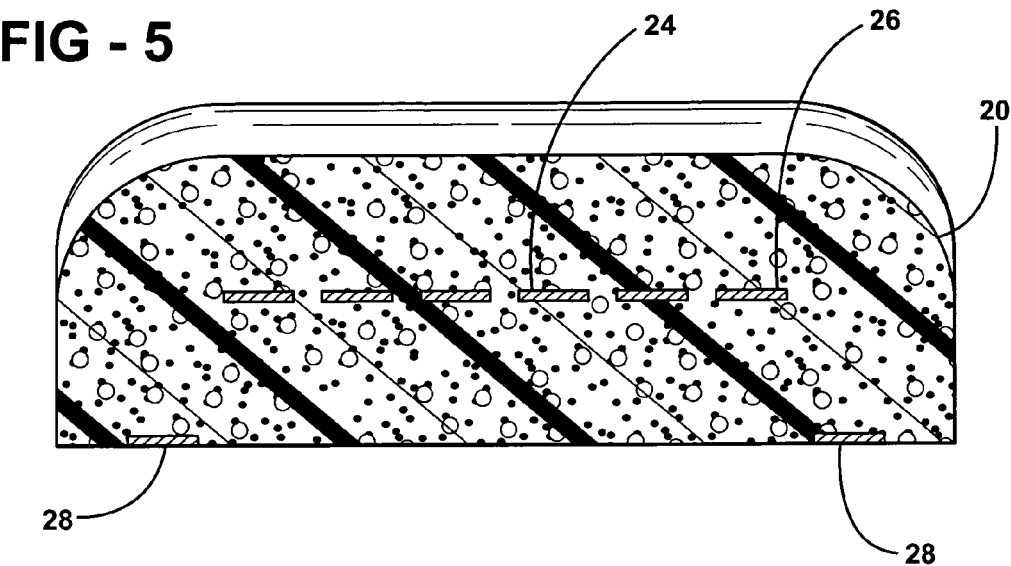
FIG. 5 is an alternative side view of the frame enclosed in the cushion of the seat assembly shown in FIG. 4.
Figure 6:
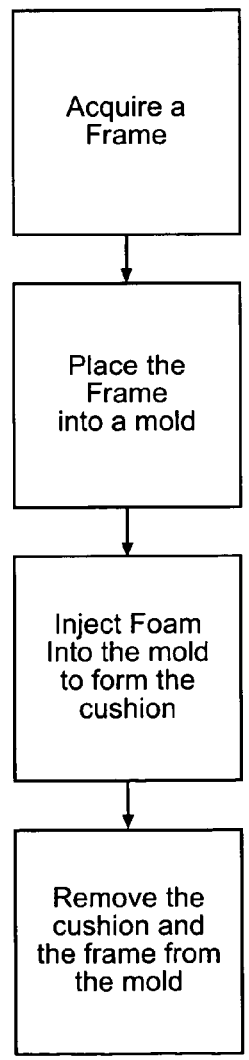
FIG. 6 is a block diagram for the method of fabricating the seat assembly of FIGS. 1-4.

A seat assembly includes a cushion 20 formed of a resilient foam having a lower face 22. The resilient foam allows the cushion 20 to substantially deform in response to a force, such as the weight of an occupant.

The assembly also includes a frame 24 and a plurality of flexible elements 26 extending between opposite sides 28 of the frame 24 and engaging the lower face 22 of the cushion 20 for flexing in response to the force applied to the cushion 20. The elements 26 absorb the force applied to the cushion 20.

The frame 24 is defined by a rectangular shape surrounding a rectangular opening. The frame 24 is formed from an uncompressible thermoplastic material.

The assembly is distinguished by each of the flexible elements 26 being a band 30. The band 30 is a strip of material that is flat, thin and includes a constant predetermined width between edges and, a constant thickness. Each of the bands 30 is integrally formed with the sides 28 of the frame 24. Furthermore, the bands 30 are spaced from one another a predetermined distance that is less than the predetermined width of the bands 30. The frame 24 is thicker than the bands 30 whereby the rectangular portion is relatively rigid, and whereas the bands 30 are flexible. The bands 30 extend in an arcuate path. Since an arch is relatively strong or resistant to forces applied against the convex side 28 of the arch, the bands 30 extend in an arcuate path i.e. the plurality of bands 30 are formed by bowing the bands 30 upwardly between the two sides 28. The sides 28 further include a plurality of holes 32 for mounting the assembly to a base (not shown).

The bowing or arching of the bands 30 correlates to the comfort of the cushion 20. The greater the bow or arch, the softer the cushion 20 will be because the cushion 20 covers the bands 30 and wraps around the frame 24. The greater bow allows additional cushion 20 to be enclosed within the rectangular opening in the frame 24, the additional cushioning allows for a more comfortable seat. Conversely, the lesser the bow, the more rigid the cushion 20 will be because a minimal amount of cushion 20 shall be enclosed within the rectangular opening in the frame 24.

The present invention also includes a method of fabricating a seat assembly including a cushion 20 of a resilient foam having a lower face 22, and a frame 24 having a plurality of flexible elements 26 extending between opposite sides 28 of the frame and engaging the lower face 22 of the cushion 20. The method is distinguished by forming a band 30 to define each of the flexible elements 26. Then the method includes bowing the bands 30 upwardly between the sides 28 of the frame. The frame 24 is positioned into a mold, and foam is injected into the mold over and around the frame to form the cushion 20 to cover the bands 30 and to wrap around the frame 24.

The present invention also includes a method of assembling a seat assembly including a cushion 20 of a resilient foam having a lower surface 22, and a frame 24 having a plurality of flexible elements 26 extending between opposite sides 28 of the frame 24 and engaging the bottom surface of the cushion 20. The method is distinguished by forming a band 30 for each of the flexible elements 26, then, bowing the bands 30 upwardly between the sides 28 of the band 30. The frame 24 is placed into a mold, and foam is injected into the mold over and around the frame 24 to form the cushion 20 to cover the bands 30 and to wrap around the frame 24.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A seat assembly comprising:
   a cushion (20) of a resilient foam having a lower face;
   a frame (24) having interconnected integral side members;
   a plurality of flexible elements (26) extending between opposite sides members (28) of said frame;
   each of said elements (26) comprising a band (30);
   each of said bands (30) being integrally formed with said sides (28) of said frame;
   said bands being encompassed within said resilient foam and said frame engaging said lower face (22) of said cushion (20) with said foam wrapping part way around said frame.

2. An assembly as set forth in claim 1 wherein said frame is further defined as being formed from an uncompressible thermoplastic material.

3. An assembly as set forth in claim 1 wherein each of said bands (30) has a predetermined width.

4. An assembly as set forth in claim 3 wherein said bands (30) are spaced from one another a predetermined distance that is less than said predetermined width of said bands (30).

5. An assembly as set forth in claim 4 wherein said frame (24) is thicker than said bands (30).

6. An assembly as set forth in claim 4 wherein said bands (30) extend in an arcuate path.

7. An assembly as set forth in claim 6 wherein said plurality of bands (30) are bowed upwardly between said two sides (28).

8. An assembly as set forth in claim 1 wherein said sides (28) include a plurality of holes (32) for mounting said assembly to a base.

9. A method of fabricating a seat assembly including a cushion (20) of a resilient foam having a lower face (22), and a frame having interconnected integral frame members, and (24) having a plurality of flexible elements (26) extending between opposite sides (28) of said frame, said flexible elements and said frame being integrally formed; said integrally formed flexible elements and said frame being positioned into a mold, injecting foam into said mold over and around said integrally formed flexible elements and said frame to from said cushion to cover said flexible elements and to partially wrap around said frame, said flexible elements being encompassed within said resilient foam and said frame engaging said lower face of said cushion.

10. A method as set forth in claim 9 further defined as bowing the flexible members upwardly between the sides (28) of the frame (24).

* * * * *